3,402,167
BASIC MONOAZO DYES
Roland Entschel, Basel, Switzerland, assignor to Sandoz Ltd. (also known as Sandoz A.G.), Basel, Switzerland
No Drawing. Filed Jan. 18, 1965, Ser. No. 426,353
Claims priority, application Switzerland, Jan. 24, 1964, 836/64; Jan. 30, 1964, 1,067/64; Mar. 25, 1964, 3,839/64
13 Claims. (Cl. 260—154)

ABSTRACT OF THE DISCLOSURE

Compounds of the formulae

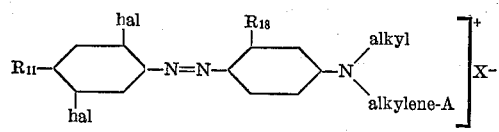

and

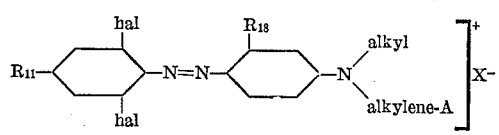

wherein
$R_{11}$ is either —CO-alkyl, alkylsulphonyl, monoalkylaminosulphonyl or dialkylaminosulphonyl;
$R_{18}$ is either hydrogen, halogen or alkyl;
hal is a halogen; and
A is a quaternary ammonium group;

are particularly useful for the dyeing, padding or printing of acrylonitrile polymer fibers.

---

This invention relates to basic dyes and a process for their production of the formula

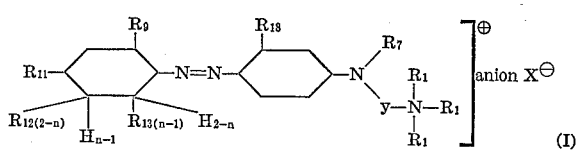

wherein each of the radicals $R_1$ represents an alkyl radical, which may be identical with or different from each other and may be substituted, or in which two or three of the radicals $R_1$ together with the quaternated N atom, or together with y, $R_7$ the N atom bound to $R_7$ and the quaternated N atom, form a saturated or unsaturated heterocyclic ring system, and in which $R_7$ represents substituted or unsubstituted alkyl,
$R_9$ represents halogen,
$R_{11}$ represents —CO-alkyl, alkylsulphonyl, mono- or dialkylaminosulphonyl,
$R_{12}$ and $R_{13}$ represent halogen,
$R_{18}$ represents hydrogen, halogen or alkyl,
y represents a substituted or unsubstituted alkylene radical,
$X^\ominus$ represents an anion and
n represents the integer 1 or 2.

The process for the production of these dyes comprises three alternative reactions as follows: The coupling reaction of 1 mole of a diazo compound of an amine of formula

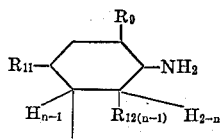

with 1 mole of a compound of formula

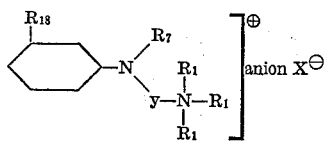

the exhaustive alkylation of a compound of formula

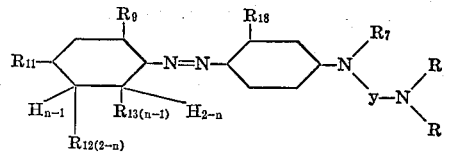

wherein each R stands for a hydrogen atom or for $R_1$; or the reaction of a compound of formula

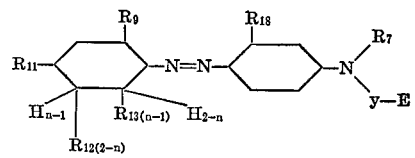

wherein E represents the acid radical of an ester, with an amine of formula

Especially valuable dyes are those of formula

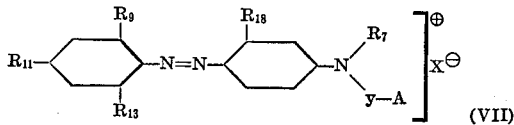

wherein $R_9$ and $R_{13}$ represents Cl or Br,
$R_{11}$ represents —CO-alkyl, alkylsulphonyl, mono- or dialkylaminosulphonyl,
$R_{18}$ represents H, Cl, Br or methyl, preferably H or methyl,
$R_7$ represents methyl, ethyl, propyl or butyl,
y represents —$C_2H_4$— or

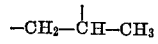

and A stands for one of the following radicals in which D represents a substituted or unsubstituted alkyl radical, preferably a methyl or ethyl radical:

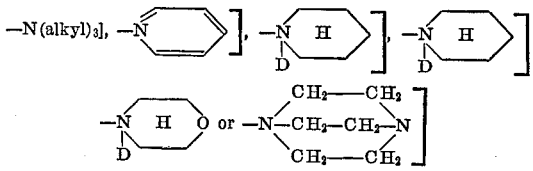

In general the unsubstituted or substituted alkyl radicals are understood to be the methyl, ethyl, propyl, iso-propyl, butyl, iso-butyl, amyl, iso-amyl, hexyl, hydroxyethyl, cyanethyl, chloromethyl or chlorethyl radicals.

Further preferred dyes are those of the formula

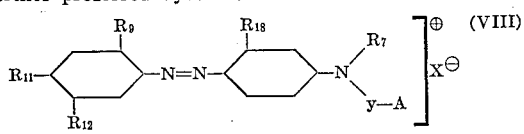

wherein $R_9$ and $R_{12}$ represent Cl or Br, $R_{11}$ represents alkylsulphonyl, mono- or di-alkylaminosulphonyl, $R_{18}$ represents H, Cl, Br or methyl, preferably H or methyl, $R_7$ represents methyl, ethyl, propyl or butyl, $y$ represents $-C_2H_4-$ or

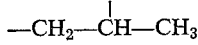

and A stands for one of the following radicals in which D represents a substituted or unsubstituted alkyl radical, preferably a methyl or ethyl radical:

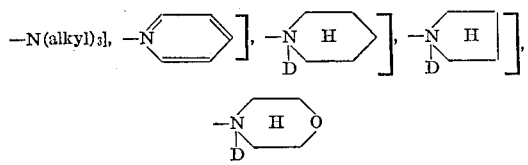

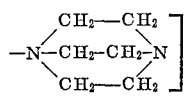

or

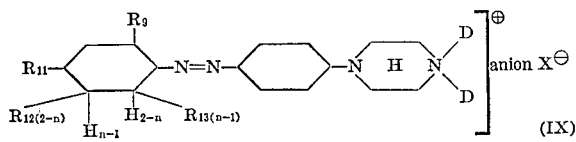

Other important dyes are those of the formula

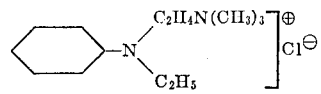

wherein D represents a substituted or unsubstituted alkyl radical, preferably a methyl, ethyl, propyl, butyl, amyl, hexyl, hydroxyethyl, chlorethyl or chloromethyl radical.

The anions X can be organic or inorganic ions, e.g. the ions of methyl sulphate, sulphate, disulphate, perchlorate, chlorate, bromide, iodide, phosphate, phosphorus molybdate, phosphorus tungsten, molybdate, benzene sulphonate, 4-chlorobenzene sulphonate, oxalate, maleinate, acetate, propionate, methane sulphonate, chloracetate or benzoate, or complex anions, such as that of zinc chloride double salts.

The azo coupling reaction can be carried out in an aqueous, organic or aqueous-organic medium, which is weakly alkaline to acid and, if necessary, buffered.

Examples of suitable acid radicals E are those of sulphuric acid (where E stands for $SO_4H$), of a sulphonic acid (E stands for $SO_3R$, where R is a substituted or unsubstituted hydrocarbon radical), of hydrogen sulphide (E stands for SH), but preferably those of the halogen hydracids (E stands for Cl, Br, etc.).

Suitable alkylating or quaternating agents are, e.g., the esters of strong mineral acids and organic sulphonic acids, alkyl chlorides, alkyl bromides, alkyl iodides, aralkyl halides, α-halogenated esters of low-molecular alkane sulphonic acids, e.g. methane-, ethane- and butane-sulphonic acids, the esters of benzenesulphonic acids which may be further substituted, e.g. the methyl, ethyl, propyl and n-butyl esters of benzenesulphonic acid, 2- or 4-methylsulphonic acid, 4-chlorobenzenesulphonic acid or 3- or 4-nitrobenzenesulphonic acid, methyl chloride, methyl bromide, methyl iodide or dimethyl sulphate, the methyl esters of low-molecular alkanesulphonic or benzenesulphonic acids.

The exhaustive alkylation or quaternation can be carried out in an inert solvent, in aqueous suspension, or in the absence of solvent in an excess of the alkylating agent at elevated temperature, the medium being buffered if necessary.

The reaction of a compound of Formula V with an amine of Formula VI can be carried out in an organic solvent in the temperature range $-50°$ to $+250°$ C., or alternatively in aqueous medium, if necessary with the addition of an organic solvent, or in the absence of solvent in the aforestated temperature range.

The dyes obtained can be isolated, e.g., by filtration, if necessary after evaporation or precipitation.

The new dyes are used preferably for the dyeing, padding or printing of filaments, fibers or textile materials in other forms which are composed of polyacrylonitrile or acrylonitrile copolymer fibers or which contain fibers of this type. Polyacrylonitrile fibers consist to more than 80% of acrylonitrile, while acrylonitrile copolymer fibers generally contain 80–95% of acrylonitrile and 20–5% of vinyl acetate, vinyl pyridine, vinyl chloride, vinylidine chloride or acrylic acid, acrylic acid ester, methacrylic acid, methacrylic acid ester, etc. These products are known under the following names, some of which are registered trademarks: Acrilan 1656 (the copolymer of 85% acrylonitrile and 15% of vinyl acetate or vinyl pyridine) and Acrilan 41, Creslan, Orlon 42 and 44, Crylor HH, Leacril N, Dynel, Exlan, Vonnel, Verel, Zefran, Wolcrylon, Ssaniw, Dralon, Courtelle, etc.

These fibers can be dyed in blends with others. Level dyeings of good tinctorial strength are obtained having good light fastness and good all-round fastness, in particular to washing, perspiration, sublimation, pleating, decatizing, pressing, rubbing, carbonizing, water, sea water, dry cleaning, cross dyeing and solvents. They possess good pH stability, good affinity and good stability to boiling at different pH values. They reserve wool and other natural and synthetic polyamide fibers. The dyes generally show good compatibility with salts. A number of the dyes of Formula I have particularly good solubility in water and organic solvents.

The dyes are suitable for dyeing and printing those polyester and polyolefin fibers that are modified by the introduction of acid groups into the fiber molecule.

The dyes are generally applied from an aqueous, neutral or acid medium at the boil and at normal atmospheric pressure, or in enclosed equipment at a temperature above the boil and at a pressure above atmospheric. The commercially available retarding agents do not interfere with dyeing but they are not necessary. The dyes are also suitable for the mass coloration or solution dyeing of acrylonitrile polymerisation products and other synthetic polymers in shades fast to light and wet treatments, for the coloration of oils and paint media, the dyeing of cotton, especially tannin-treated cotton, cellulose, regenerated cellulose and paper in all forms occurring in manufacture. It has been found that mixtures of two or more dyes of Formula I can be used with advantage.

In the following examples the parts and percentages are by weight and the temperatures in degrees centigrade.

Example 1

28 parts of (4 - amino - 3,5-dibromophenyl)-1-methylsulphone are diazotized with nitrosylsulphuric acid in the normal way and coupled with 24.5 parts of (N-ethyl-N-phenyl)-aminoethyl-trimethyl-ammonium chloride of the formula

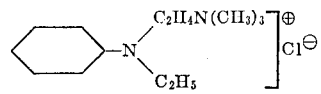

in solution in 400 parts of water at 0°. After neutralization with sodium hydroxide solution, 300 parts of 25% sodium chloride solution are added, and the product filtered off and dried. A powder of orange color is obtained.

Example 2

10.5 parts of the dye of the formula

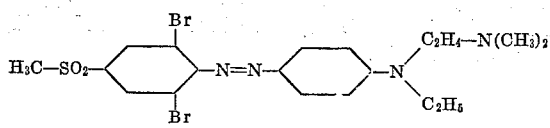

are stirred into 200 parts of dimethyl formamide. 2.8 parts of dimethyl sulphate are added dropwise at 50° and the temperature maintained at 60–70° until a sample is dilutable with water. 300 parts of warm water are added, the product filtered off and entered into 200 parts of a 25% aqueous solution of sodium chloride. The dye obtained is identical with that of Example 1.

Example 3

26.9 parts of 1-amino-2,6-dichlorobenzene-4-sulphonic acid-dimethyl amide are diazotized in the normal way with nitrosylsulphuric acid and coupled at 0° with 27.5 parts of (N-ethyl-N-phenyl)-aminoethylpyridine chloride in solution in 400 parts of water. The product is salted out with sodium chloride, filtered and dried. It is an orange-colored powder which gives reddish yellow shades of excellent fastness on polyacrylonitrile fibers.

The (N - ethyl - N-phenyl)-aminoethyl-pyridinium chloride used in the reaction is obtained by reacting N-ethyl-N-$\beta$-chlorethyl-aminobenzene with the equivalent amount of pyridine in alcohol or water at 80–90°.

The identical dye is obtained when the diazotized 1-amino-2,6-dichlorobenzene-4-sulphonic acid-dimethyl amide is coupled with N-ethyl-N-$\beta$-chlorethyl-aminobenzene and the product reacted with pyridine.

Dyeing Example A 20 parts of the dye obtained according to Example 1 and 80 parts of dextrin are intimately mixed in a ball mill for 48 hours. 1 part of the mixture is pasted with 1 part of 40% acetic acid, 400 parts of distilled water at 60° are poured over the paste with constant stirring, and after boiling for a short time it is diluted with 7600 parts of distilled water and 2 parts of glacial acetic acid are added. After treatment for 10–15 minutes at 60° in a bath of 8000 parts of water and 2 parts of glacial acetic acid, 100 parts of Dralon (registered trademark) are entered into the dyebath at 60°. The dyebath is raised to 100° in 30 minutes, boiled for 1 hour, then the goods are rinsed and dried. A level orange dyeing with excellent light and very good wet fastness is obtained.

Pad dyeing Example B

A padding liquor is prepared with 50 grams per liter of dye (i.e. the equivalent amount of the dyeing preparation described in Dyeing Example A), 3 grams per liter of sodium alginate, 5 grams per liter of concentrated acetic acid and 20 grams per liter of Glauber's salt. This liquor is padded cold on a polyacrylonitrile fiber fabric on a two- or three-bowl pad at expression of 80%. After intermediare drying at 90° on stenters, in a hot flue or infrared drier, the pad dyeing is fixed on stenters by 1–3 minutes exposure in dry air at 170–190°, and is then rinsed, soaped, rinsed again and dried. An orange dyeing having excellent light fastness is obtained.

Printing Example C

A printing paste is prepared with:

| | Parts |
|---|---|
| Dye (the equivalent amount of the dyeing preparation described in the dyeing example) | 75 |
| Concentrated acetic acid | 10 |
| Sodium alginate thickening | 450 |
| Cationic softener, e.g. a condensation product of equimolar amounts of stearic acid and triethanolamine | 25 |
| Glauber's salt | 25 |
| Water | 415 |
| | 1000 |

A fabric of polyacrylonitrile fiber is printed with this paste by the normal block method, air dried, steamed in a star steamer with standard steam for 20–30 minutes, rinsed, soaped, rinsed again and dried. An orange print with very good fastness properties is obtained.

Further valuable dyes which can be obtained according to the procedures described in Examples 1 to 3 are listed in the following table. They correspond to the formula

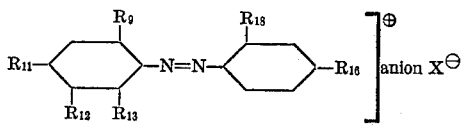

in which the symbols $R_9$, $R_{11}$, $R_{12}$, $R_{13}$, $R_{16}$ and $R_{18}$ have the meanings given them in the table. The anion $X^\ominus$ can be any one of those named in the description. The symbols $K_1$ to $K_{13}$ stands for the following radicals.

$K_1$ for the radical

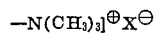

$K_2$ for the radical

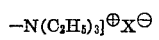

$K_3$ for the radical

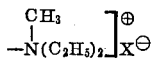

$K_4$ for the radical

$K_5$ for the radical

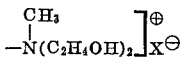

$K_6$ for the radical

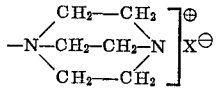

$K_7$ for the radical

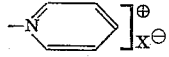

$K_8$ for the radical

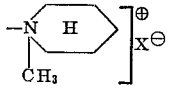

$K_9$ for the radical

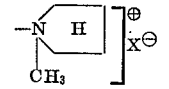

$K_{10}$ for the radical

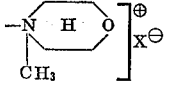

$K_{11}$ for the radical

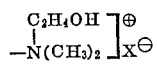

$K_{12}$ for the radical

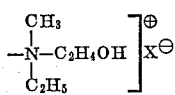

$K_{13}$ for the radical

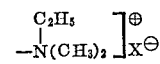

In each example in the table the radical K can be replaced by any other radical K. Thus where $K_1$ appears in a tabulated example any one of the symbols $K_2$ to $K_{13}$ can stand in its place.

TABLE

| Example Number | $R_9$ | $R_{11}$ | $R_{12}$ | $R_{13}$ | $R_{16}$ | $R_{18}$ | Shade of Dyeing on Dralon |
|---|---|---|---|---|---|---|---|
| 4 | Cl | $CH_3SO_2$ | H | Cl | $N(C_2H_4-K_1)(C_2H_5)$ | $CH_3$ | Yellow-orange. |
| 5 | Br | $CH_3SO_2$ | H | Br | $N(C_2H_4-K_1)(C_2H_5)$ | $CH_3$ | Do. |
| 6 | Cl | $CH_3SO_2$ | H | Cl | $N(C_2H_4-K_1)(C_2H_5)$ | H | Yellow. |
| 7 | Cl | $CH_3SO_2$ | H | Cl | $N(C_2H_4-K_1)(CH_3)$ | H | Do. |
| 8 | Cl | $CH_3SO_2$ | H | Cl | $N(C_2H_5)(CH_2-CH(CH_3)-K_1)$ | H | Do. |
| 9 | Cl | $(CH_3)_2NSO_2$ | H | Cl | $N(CH_3)(C_2H_4-K_1)$ | H | Do. |
| 10 | Br | $(CH_3)_2NSO_2$ | H | Br | $N(CH_3)(C_2H_4-K_1)$ | H | Do. |
| 11 | Br | $(CH_3)_2NSO_2$ | H | Br | $N(C_2H_4-K_1)(C_2H_5)$ | H | Do. |
| 12 | Cl | $(CH_3)_2NSO_2$ | H | Cl | $N(C_2H_4-K_1)(C_2H_5)$ | H | Do. |
| 13 | Br | $(CH_3)_2NSO_2$ | H | Br | $N(C_2H_4-K_1)(C_2H_5)$ | $CH_3$ | Orange. |
| 14 | Cl | $(CH_3)_2NSO_2$ | H | Cl | $N(C_2H_4-K_1)(C_2H_5)$ | $CH_3$ | Do. |
| 15 | Br | $CH_3NHSO_2$ | H | Br | $N(C_2H_4-K_1)(C_2H_5)$ | H | Yellow. |
| 16 | Br | $(CH_3)_2N-SO_2$ | H | Br | $N(CH_2-CH(K_1)-CH_3)(C_2H_5)$ | H | Do. |
| 17 | Cl | $(CH_3)_2N-SO_2$ | H | Cl | $N(CH_2-CH(K_1)-CH_3)(C_2H_5)$ | $CH_3$ | Orange. |

TABLE—Continued

| Example Number | $R_9$ | $R_{11}$ | $R_{12}$ | $R_{13}$ | $R_{16}$ | $R_{18}$ | Shade of Dyeing on Dralon |
|---|---|---|---|---|---|---|---|
| 18 | Cl | $(CH_3)_2N-SO_2$ | H | Cl | $N\begin{array}{l}CH_2-CH(K_1)-CH_3\\C_2H_5\end{array}$ | H | Yellow. |
| 19 | Br | $(CH_3)_2N-SO_2$ | H | Br | $N\begin{array}{l}CH_2-CH(K_1)-CH_3\\C_2H_5\end{array}$ | $CH_3$ | Orange. |
| 20 | Cl | $(C_2H_5)_2N-SO_2$ | H | Cl | $N\begin{array}{l}CH_2-CH(K_1)-CH_3\\C_2H_5\end{array}$ | H | Yellow. |
| 21 | Br | $\begin{array}{l}HO-C_2H_4\\C_2H_5\end{array}N-SO_2$ | H | Br | $N\begin{array}{l}C_2H_4-K_1\\C_2H_5\end{array}$ | H | Do. |
| 22 | Cl | $(CH_3)_2N-SO_2$ | H | Cl | $N\text{—}\bigcirc\text{—}N(CH_3)_2$ (H) | H | Do. |
| 23 | Br | $(CH_3)_2N-SO_2$ | H | Br | $N\text{—}\bigcirc\text{—}N(CH_3)_2$ (H) | H | Do. |
| 24 | Br | $CH_3SO_2$ | H | Br | $N\text{—}\bigcirc\text{—}N(CH_3)_2$ (H) | H | Do. |
| 25 | Cl | $CH_3SO_2$ | H | Cl | $N\text{—}\bigcirc\text{—}N(C_2H_4OH)(CH_3)$ (H) | H | Do. |
| 26 | Cl | $(CH_3)_2NSO_2$ | Cl | H | $N\begin{array}{l}C_2H_4-K_1\\C_2H_5\end{array}$ | H | Orange. |
| 27 | Cl | $CH_3SO_2$ | H | Br | $N\begin{array}{l}C_2H_4-K_1\\CH_3\end{array}$ | H | Yellow. |
| 28 | Br | $C_2H_5SO_2$ | H | Cl | $N\begin{array}{l}C_2H_4-K_1\\CH_3\end{array}$ | $CH_3$ | Orange. |
| 29 | Cl | $(CH_3)_2NSO_2$ | H | Br | $N\begin{array}{l}C_2H_4-K_1\\CH_3\end{array}$ | H | Yellow. |
| 30 | Cl | $CH_3NHSO_2$ | H | Cl | $N\begin{array}{l}C_2H_5\\C_2H_4-K_1\end{array}$ | H | Do. |
| 31 | Cl | $CH_3SO_2$ | H | Cl | $N\begin{array}{l}C_2H_5\\C_2H_4-K_2\end{array}$ | $CH_3$ | Yellow-orange. |
| 32 | Br | $CH_3SO_2$ | H | Br | $N\begin{array}{l}C_2H_5\\C_2H_4-K_2\end{array}$ | $CH_3$ | Do. |
| 33 | Cl | $CH_3SO_2$ | H | Cl | $N\begin{array}{l}C_2H_5\\C_2H_4-K_2\end{array}$ | H | Yellow. |

TABLE—Continued

| Example Number | $R_9$ | $R_{11}$ | $R_{12}$ | $R_{13}$ | $R_{16}$ | $R_{18}$ | Shade of Dyeing on Dralon |
|---|---|---|---|---|---|---|---|
| 34 | Cl | $CH_3SO_2$ | H | Cl | $N(CH_3)(C_2H_4-K_1)$ | H | Do. |
| 35 | Cl | $CH_3SO_2$ | H | Cl | $N(C_2H_5)(CH_2-CH(K_6)-CH_3)$ | H | Do. |
| 36 | Cl | $(CH_3)_2N-SO_2$ | H | Cl | $N(CH_3)(C_2H_4-K_7)$ | H | Do. |
| 37 | Br | $(CH_3)_2N-SO_2$ | H | Br | $N(CH_3)(C_2H_4-K_7)$ | H | Do. |
| 38 | Br | $(CH_3)_2N-SO_2$ | H | Br | $N(C_2H_4-K_3)(C_2H_5)$ | H | Do. |
| 39 | Cl | $(CH_3)_2N-SO_2$ | H | Cl | $N(C_2H_4-K_3)(C_2H_5)$ | H | Do. |
| 40 | Br | $(CH_3)_2N-SO_2$ | H | Br | $N(C_2H_4-K_3)(C_2H_5)$ | $CH_3$ | Orange. |
| 41 | Cl | $(CH_3)_2N-SO_2$ | H | Cl | $N(C_2H_4-K_3)(C_2H_5)$ | $CH_3$ | Yellow. |
| 42 | Br | $CH_3NH-SO_2$ | H | Br | $N(C_2H_4-K_3)(C_2H_5)$ | H | Do. |
| 43 | Br | $(CH_3)_2N-SO_2$ | H | Br | $N(CH_2-CH(K_2)-CH_3)(C_2H_5)$ | H | Do. |
| 44 | Cl | $(CH_3)_2N-SO_2$ | H | Cl | $N(CH_2-CH(K_2)-CH_3)(C_2H_5)$ | $CH_3$ | Orange. |
| 45 | Cl | $(CH_3)_2N-SO_2$ | H | Cl | $N(CH_2-CH(K_2)-CH_3)(C_2H_5)$ | H | Yellow. |
| 46 | Br | $(CH_3)_2N-SO_2$ | H | Br | $N(CH_2-CH(K_2)-CH_3)(C_2H_5)$ | $CH_3$ | Orange. |
| 47 | Cl | $(C_2H_5)_2N-SO_2$ | H | Cl | $N(CH_2-CH(K_2)-CH_3)(C_2H_5)$ | H | Yellow. |
| 48 | Br | $(HO-C_2H_4)(C_2H_5)N-SO_2$ | H | Br | $N(C_2H_4-K_9)(C_2H_5)$ | H | Do. |
| 49 | Cl | $(CH_3)_2N-SO_2$ | H | Cl | $N(C_2H_5)\text{-phenyl-}NH(C_2H_5)$ | H | Do. |

3,402,167

TABLE—Continued

| Example Number | $R_9$ | $R_{11}$ | $R_{12}$ | $R_{13}$ | $R_{16}$ | $R_{18}$ | Shade of Dyeing on Dralon |
|---|---|---|---|---|---|---|---|
| 50 | Br | $(CH_3)_2N-SO_2$ | H | Br | N(C$_2$H$_5$)—H—N(C$_2$H$_5$) (piperazine) | H | Do. |
| 51 | Br | $CH_3SO_2$ | H | Br | N(C$_2$H$_5$)—H—N(C$_2$H$_5$) (piperazine) | H | Do. |
| 52 | Cl | $(CH_3)_2N-SO_2$ | Cl | H | $N(C_2H_4-K_5)(C_2H_5)$ | H | Orange. |
| 53 | Cl | $CH_3SO_2$ | H | Br | $N(C_2H_4-K_2)(CH_3)$ | H | Yellow. |
| 54 | Br | $C_2H_5SO_2$ | H | Cl | $N(C_2H_4-K_2)(CH_3)$ | $CH_3$ | Orange. |
| 55 | Cl | $(CH_3)_2N-SO_2$ | H | Br | $N(C_2H_4-K_2)(CH_3)$ | H | Yellow. |
| 56 | Cl | $CH_3NHSO_2$ | H | Br | $N(C_2H_5)(C_2H_4-K_3)$ | H | Do. |
| 57 | Br | $CH_3SO_2$ | H | Br | $N(C_2H_5)(C_2H_4-K_2)$ | H | Do. |
| 58 | Br | $CH_3SO_2$ | H | Br | $N(C_2H_4-K_3)(C_2H_5)$ | H | Do. |
| 59 | Br | $CH_3SO_2$ | H | Br | $N(C_2H_4-K_5)(C_2H_5)$ | H | Do. |
| 60 | Br | $CH_3SO_2$ | H | Br | $N(C_2H_4-K_7)(C_2H_5)$ | H | Do. |
| 61 | Cl | $(CH_3)_2N-SO_2$ | H | Cl | $N(C_2H_4-K_2)(C_2H_5)$ | H | Do. |
| 62 | Cl | $(CH_3)_2N-SO_2$ | Cl | H | $N(C_2H_4-K_2)(CH_3)$ | H | Orange. |
| 63 | Br | $(CH_3)_2-CH-NH-SO_2$ | Br | H | $N(C_2H_4-K_1)(C_2H_5)$ | H | Do. |
| 64 | Cl | $(CH_3)_2N-SO_2$ | Cl | H | $N(C_2H_4-K_1)(C_2H_5)$ | $CH_3$ | Do. |
| 65 | Br | $CH_3CO$ | H | Br | $N(C_2H_4-K_1)(C_2H_5)$ | H | Yellow. |
| 66 | Br | $CH_3CO$ | Br | H | $N(C_2H_4-K_1)(C_2H_5)$ | H | Do. |
| 67 | Cl | $CH_3CO$ | H | Cl | $N(C_2H_4-K_1)(C_2H_5)$ | H | Do. |

TABLE—Continued

| Example Number | $R_9$ | $R_{11}$ | $R_{12}$ | $R_{13}$ | $R_{16}$ | $R_{18}$ | Shade of Dyeing on Dralon |
|---|---|---|---|---|---|---|---|
| 68 | Cl | $CH_3CO$ | Cl | H | $N(C_2H_4-K_1)(C_2H_5)$ | H | Do. |
| 69 | Cl | $CH_3CO$ | Cl | H | $N(CH_2-CH(K_1)(CH_3))(C_2H_5)$ | H | Do. |
| 70 | Br | $CH_3CO$ | Br | H | $N(CH_2-CH(K_1)(CH_3))(C_2H_5)$ | H | Do. |
| 71 | Br | $CH_3CO$ | Br | H | $N(CH_2-CH(K_1)(CH_3))(C_2H_5)$ | $CH_3$ | Do. |
| 72 | Cl | $CH_3CO$ | Cl | H | $N(C_2H_4-K_2)(CH_3)$ | Cl | Do. |
| 73 | Cl | $(CH_3)_2NSO_2$ | H | Cl | $N(C_2H_4-K_3)(C_2H_5)$ | H | Do. |
| 74 | Cl | $(CH_3)_2NSO_2$ | H | Cl | $N(C_2H_4-K_4)(C_2H_5)$ | H | Do. |
| 75 | Cl | $(CH_3)_2NSO_2$ | H | Cl | $N(C_2H_4-K_5)(C_2H_5)$ | H | Do. |
| 76 | Cl | $(CH_3)_2NSO_2$ | H | Cl | $N(C_2H_4-K_6)(C_2H_5)$ | H | Do. |
| 77 | Cl | $(CH_3)_2NSO_2$ | H | Cl | $N(C_2H_4-K_7)(C_2H_5)$ | H | Do. |
| 78 | Cl | $(CH_3)_2NSO_2$ | H | Cl | $N(C_2H_4-K_8)(C_2H_5)$ | H | Do. |
| 79 | Cl | $(CH_3)_2SNO_2$ | H | Cl | $N(C_2H_4-K_9)(C_2H_5)$ | H | Do. |
| 80 | Cl | $(CH_3)_2NSO_2$ | H | Cl | $N(C_2H_4-K_{10})(C_2H_5)$ | H | Do. |
| 81 | Cl | $(CH_3)_2NSO_2$ | H | Cl | $N(C_2H_4-K_{11})(C_2H_5)$ | H | Do. |
| 82 | Cl | $(CH_3)_2NSO_2$ | H | Cl | $N(C_2H_4-K_{12})(C_2H_5)$ | H | Do. |
| 83 | Cl | $(CH_3)_2NSO_2$ | H | Cl | $N(C_2H_4-K_{13})(C_2H_5)$ | H | Do. |

Formulae of representative dyes of the foregoing examples are as follows:
Example 6
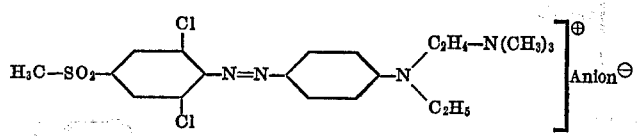
Example 11
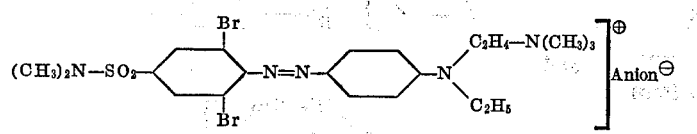
Example 12
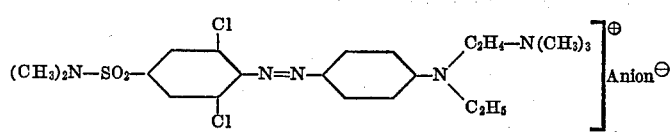
Example 17
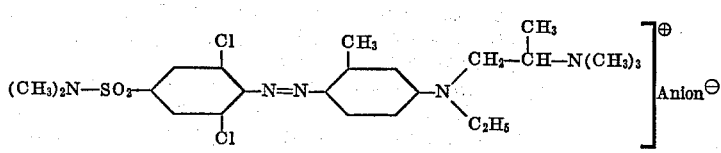
Example 26
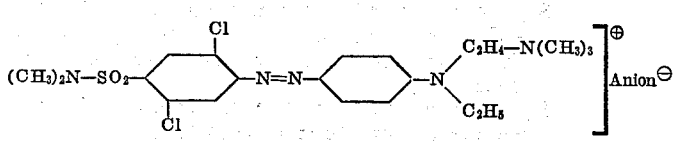
Example 61
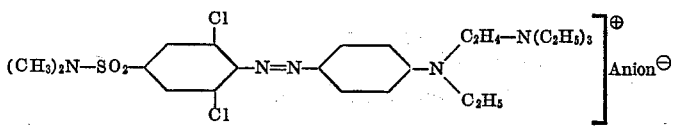
Example 62
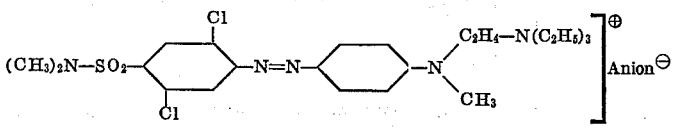
Example 63
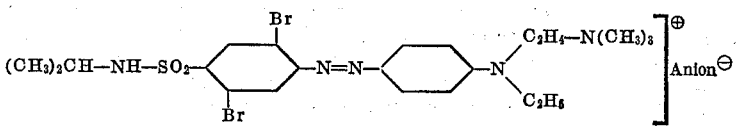

Example 64

$$(CH_3)_2N-SO_2-\underset{\underset{Cl}{|}}{\overset{\overset{Cl}{|}}{C_6H_2}}-N=N-\underset{}{\overset{\overset{CH_3}{|}}{C_6H_3}}-N\underset{C_2H_5}{\overset{C_2H_4-N(CH_3)_3}{\diagup}}\Bigg]^{\oplus} \text{Anion}^{\ominus}$$

Having thus disclosed the invention what I claim is:

1. Basic dyes of the formula $$R_{11}-\underset{\underset{R_{13}}{|}}{\overset{\overset{R_9}{|}}{C_6H_2}}-N=N-\overset{\overset{R_{18}}{|}}{C_6H_3}-N\underset{y-A}{\overset{R_7}{\diagup}}\Bigg]^{\oplus} \text{anion } X^{\ominus} \quad \text{(VII)}$$

wherein $R_9$ and $R_{13}$ represent a member selected from the group consisting of Cl and Br,
$R_{11}$ represents a member selected from the group consisting of —CO-alkyl, alkylsulfonyl, mono- and dialkylaminosulfonyl, the alkyl being lower alkyl,
$R_{18}$ represents a member selected from the group consisting of H, Cl, Br and methyl,
$R_7$ represents a member selected from the group consisting of methyl, ethyl, propyl and butyl,
y represents a member selected from the group consisting of —$C_2H_4$— and $$-CH_2-\overset{|}{C}H-CH_3,$$

$X^{\ominus}$ represents an anion
and A stands for one of the following radicals in which D represents a member selected from the group consisting of methyl, ethyl, propyl, isopropyl, butyl, isobutyl, amyl, isoamyl, hexyl, hydroxyethyl, cyanethyl and chloromethyl —N(alkyl having from 1 to 6 carbon atoms)$_3$], —N$\diagup$$\diagdown$ $-\underset{D}{N}\diagup H \diagdown$], $-\underset{D}{N}\diagup H \diagdown$], $-\underset{D}{N}\diagup H \diagdown O$]

and $$-N\underset{CH_2-CH_2}{\overset{CH_2-CH_2}{\diagup}}N\diagdown_{CH_2-CH_2}$$

2. Basic dyes of the formula $$R_{11}-\underset{\underset{R_{12}}{|}}{\overset{\overset{R_9}{|}}{C_6H_2}}-N=N-\overset{\overset{R_{18}}{|}}{C_6H_3}-N\underset{y-A}{\overset{R_7}{\diagup}}\Bigg]^{\oplus} \text{anion } X^{\oplus} \quad \text{(VIII)}$$

wherein $R_9$ and $R_{12}$ represent a member selected from the group consisting of Cl and Br,
$R_{11}$ represents a member selected from the group consisting of alkylsulfonyl, mono- and dialkylaminosulfonyl, each alkyl being a lower alkyl,
$R_{18}$ represents a member selected from the group consisting of H, Cl, Br and methyl
$R_7$ represents a member selected from the group consisting of methyl, ethyl, propyl and butyl,
y represents a member selected from the group consisting of —$C_2H_4$— and $$-CH_2-\overset{|}{C}H-CH_3,$$

$X^{\ominus}$ represents an anion
and A stands for one of the following radicals in which D represents a member selected from the group consisting of methyl, ethyl, propyl, isopropyl, butyl, isobutyl, amyl, isoamyl, hexyl, hydroxyethyl, cyanethyl and chloromethyl —N(alkyl having from 1 to 6 carbon atoms)$_3$], —N$\diagup$$\diagdown$]

$-\underset{D}{N}\diagup H \diagdown$], $-\underset{D}{N}\diagup H \diagdown$], $-\underset{D}{N}\diagup H \diagdown O$]

and $$-N\underset{CH_2-CH_2}{\overset{CH_2-CH_2}{\diagup}}N\diagdown_{CH_2-CH_2}$$

3. A basic dye of the formula $$R_{11}-\underset{\underset{R_{12(2-n)}}{|}\;\underset{H_{n-1}}{|}\;\underset{R_{13(n-1)}}{|}\;H_{2-n}}{\overset{\overset{R_9}{|}}{C_6H_2}}-N=N-\overset{\overset{R_{18}}{|}}{C_6H_3}-N\underset{y-N-R_1}{\overset{R_7}{\diagup}}\underset{R_1}{\overset{R_1}{\diagdown}}\Bigg]^{\oplus} \text{anion } X^{\ominus}$$

wherein each $R_1$ is, independently, a member selected from the group consisting of methyl, ethyl, propyl, butyl, isobutyl, amyl, isoamyl, hexyl, hydroxyethyl, cyanethyl and chloromethyl,
$R_7$ is a member selected from the group consisting of methyl, ethyl, propyl, butyl, isobutyl, amyl, isoamyl, hexyl, hydroxyethyl, cyanethyl and chloroethyl,
each $R_9$, $R_{12}$ and $R_{13}$ is, independently, a member selected from the group consisting of chloro and bromo,
$R_{11}$ is a member selected from the group consisting of —Co-alkyl, alkylsulphonyl, monoalkylaminosulphonyl and dialkylaminosulphonyl, the alkyl being lower alkyl,
$R_{18}$ is a member selected from the group consisting of hydrogen, chloro, bromo and methyl,
y is a member selected from the group consisting of —$C_2H_4$— and $$-CH_2-\overset{|}{C}H-CH_3$$

$X^{\ominus}$ is an anion; and
n is one of the integers 1 and 2.

4. Basic dyes of the formula $$R_{11}-\underset{\underset{R_{12(2-n)}}{|}\;\underset{H_{n-1}}{|}\;\underset{R_{13(n-1)}}{|}\;H_{2-n}}{\overset{\overset{R_9}{|}}{C_6H_2}}-N=N-C_6H_4-N\underset{}{\overset{H}{\diagdown}}N\underset{D}{\overset{D}{\diagup}}\Bigg]^{\oplus} \text{anion } X^{\ominus} \quad \text{(IX)}$$

wherein $R_9$ represents a member selected from the group consisting of chloro and bromo,
$R_{11}$ represents a member selected from the group consisting of —CO-alkyl, alkylsulfonyl, mono- and dialkylaminosulfonyl, each alkyl being lower alkyl,
each of $R_{12}$ and $R_{13}$ represents a member selected from the group consisting of chloro and bromo,
D represents a member selected from the group consisting of methyl, ethyl, propyl, butyl, amyl, hexyl, hydroxyethyl, chloromethyl and chloroethyl,
and $X^{\ominus}$ represents an anion.

5. The basic dye of the formula

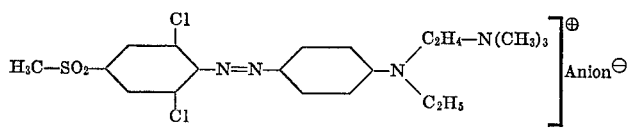

6. The basic dye of the formula

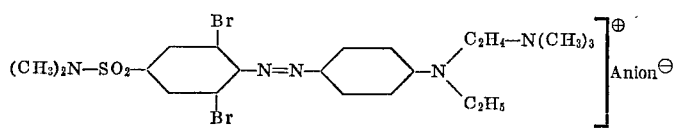

7. The basic dye of the formula

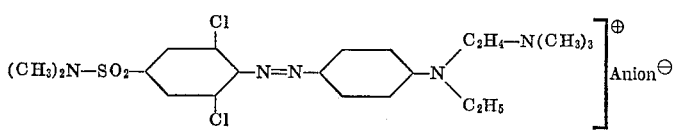

8. The basic dye of the formula

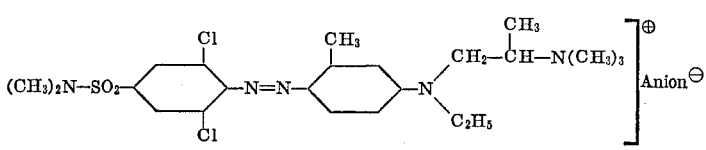

9. The basic dye of the formula

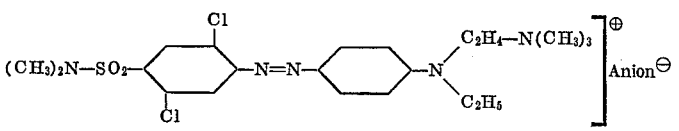

10. The basic dye of the formula

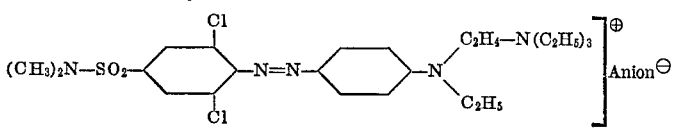

11. The basic dye of the formula

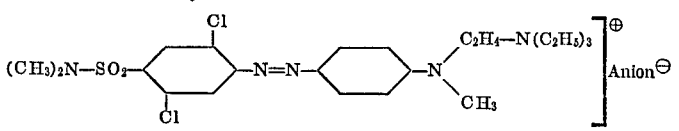

12. The basic dye of the formula

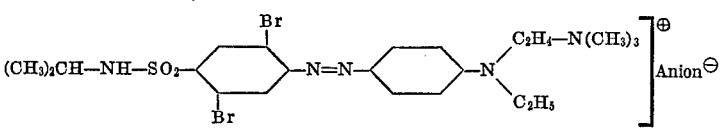

13. The basic dye of the formula

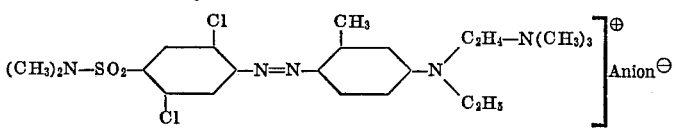

References Cited

UNITED STATES PATENTS

| | | | |
|---|---|---|---|
| 2,022,921 | 12/1935 | Mietsch et al. | 260—206 |
| 2,099,525 | 11/1937 | Krzikalla et al. | 260—205 |
| 2,238,485 | 4/1941 | Dickey et al. | 260—205 |
| 2,972,508 | 2/1961 | Kruckenberg et al. | 260—205 XR |
| 3,079,377 | 2/1963 | Sartori | 260—205 |

FLOYD D. HIGEL, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,167                                                 September 17, 1968

Roland Entschel

It is certified that error appears in the above identified patent and that said Letters Patent are hereby corrected as shown below:

Column 2, line 5, "$R_{12(n-1)}$" should read -- $R_{13(n-1)}$ --; line 47, "represents" should read -- represent --; line 55, after "$-CH_2-\overset{\text{\textbar}}{C}H-CH_3$" insert a comma; line 65, after the first formula insert a bracket. Column 3, line 15, after "$-CH_2-\overset{\text{\textbar}}{C}H-CH_3$" insert a comma; line 49, "tungsten, molybdate," should read -- tungsten molybdate, --. Column 6, line 10, "standard" should read -- saturated --. Column 15, Example 79, second column "$(CH_3)_2SNO_2$" should read -- $(CH_3)_2NSO_2$ --. Column 20, lines 38 and 74, "chloroethyl", each occurrence, should read -- chlorethyl --; same column 20, line 43, "-Co-alkyl," should read -- -CO-alkyl, --.

Signed and sealed this 17th day of March 1970.

(SEAL)
Attest:

Edward M. Fletcher, Jr.                          WILLIAM E. SCHUYLER, JR.
Attesting Officer                                         Commissioner of Patents